United States Patent [19]

Hallström

[11] Patent Number: 4,574,675
[45] Date of Patent: Mar. 11, 1986

[54] BAND-SAW HAVING ADJUSTABLE GUIDE MEANS FOR THE BAND

[75] Inventor: Helge Hallström, Vellinge, Sweden

[73] Assignee: Northern Food-Line Machines K.S., Ronne, Denmark

[21] Appl. No.: 552,179
[22] PCT Filed: Feb. 21, 1983
[86] PCT No.: PCT/SE83/00058
§ 371 Date: Oct. 19, 1983
§ 102(e) Date: Oct. 19, 1983
[87] PCT Pub. No.: WO83/02912
PCT Pub. Date: Sep. 1, 1983

[30] Foreign Application Priority Data

Feb. 19, 1982 [SE] Sweden ............................. 8201037

[51] Int. Cl.[4] .................................. B23D 55/08
[52] U.S. Cl. ...................... 83/804; 83/808; 83/820; 83/871
[58] Field of Search .......... 83/404.4, 407, 803–808, 83/811, 812, 820, 829, 871

[56] References Cited

U.S. PATENT DOCUMENTS

| | | | |
|---|---|---|---|
| 283,157 | 8/1883 | Smith | 83/404.4 |
| 1,322,743 | 11/1919 | Wright | 83/829 |
| 1,855,706 | 4/1932 | Criner et al. | |
| 2,126,987 | 8/1938 | Criner | |
| 2,261,816 | 11/1941 | Williams | 83/829 X |
| 2,297,710 | 10/1942 | Kottmann et al. | |
| 2,705,510 | 4/1955 | Stocke | 83/811 X |
| 3,534,647 | 10/1970 | Mills | 83/820 |

FOREIGN PATENT DOCUMENTS 738873 6/1980 U.S.S.R. ............................. 83/808

Primary Examiner—James M. Meister
Attorney, Agent, or Firm—Ziems, Walter & Shannon

[57] ABSTRACT

A band saw (1) for slicing e.g. deepfrozen fish blocks. The band saw comprises two drums (10) arranged on a frame (11) and at least two saw blades (12), which run over the drums beside each other. The saw blades pass through one or several parallel blade guiding units (13) where they are twisted or inclined a predetermined angle (x) relative to the axis of the drum. The guiding unit (13) comprises cylinders (25) having inserts (20–22) which positively guide the saw blades parallel to each other. The cylinders (25) are locked in place by washers (19), which are positioned and aligned by an alignment tool.

6 Claims, 8 Drawing Figures

BAND-SAW HAVING ADJUSTABLE GUIDE MEANS FOR THE BAND

The present invention relates to a band-saw including several blades for cutting blocks, e.g. frozen fish-blocks, into several slices.

In the manufacturing of e.g. fish-stick, one starts from big frozen fish-blocks (about 0.6×0.25×0.5 m) which are divided in three long stocks, called loaves. Those loaves are sliced longitudinally into several slices, usually 3–6, which finally are cut transversely in order to produce fish-sticks or bigger portion pieces.

The first cutting of the block is usually made by means of a double band-saw, i.e. two identical band-saws positioned beside each other, whereby the fish-block is fed perpendicular to the saw blades. In this way, the cutting is made in a single operation. Alternately, the cutting of the block into loaves is made by a single saw in several operations.

The final sawing from slices to portion bits is usually made by feeding the slices transversely over several disc saw blades, which are spaced from each other a distance corresponding to the width of the desire fish-pin or portion piece. Also this partition can be made in a single operation.

The sawing operation which constitutes a problem today is the slicing of the loaves into slices.

It is not possible to make this slicing in the same manner as the partition of the portion pieces, i.e. to use several parallel disc saw blades. If so, sawing depth must be at least equal to the width of the loaf, i.e. between 8 and 9 cm, and in order to avoid unnecessary spill and in order to achieve a fine cutting surface, which is essential for the appearance of the final product, the saw blade must be very thin, about 0.4 mm. Such a thin blade would vibrate very heavily, would not provide high precision, and would not withstand the high loads occurring in the sawing of deep-frozen blocks.

Thus, the use of a band-saw is ultimative. However, the above-mentioned double band-saw will give a maximum of three slices in the same operation.

This slicing operation is today performed by slicing each single slice in a single band-saw. This means that in order to achieve five slices, the loaf must be fed through the saw four times, and so on.

Thus, the operation cannot be included in a fully automatic chain, since it has to be performed manually, which is very time consuming and expensive.

According to another known method, the loaves are sliced by means of a device comprising five separate band-saws positioned after each other. However, this device has several drawbacks. It is about five meters long and is thus very bulky, which makes it unsuitable for smaller industries. The investment costs are high and the time and expenses for cleaning and service are considerable. Moreover the sawing spill must be collected at several positions.

The object of the present invention is to provide a band-saw for slicing a desired number of slices in a single operation. Such a band-saw can be included in a fully automatic chain.

Another object of the present invention is to provide a band-saw which lacks the above-mentioned drawbacks.

Said objects are achieved by a band-saw for slicing a block of e.g. deep-frozen fish, into slices, wherein two drums are arranged on a support. At least two endless band-saw blades are mounted on said drum close to and adjacent to each other. At least one guide for each saw blade is positioned between the drums and is adapted to twist each saw blade a certain angle in relation to the axis of the drum. The guide comprises inserts of a hard metal which guides the saw blades so that each saw blade is completely parallel with the adjacent saw blade.

Further objects and advantages of the invention will become apparent from the description below of a preferred embodiment of the invention with reference to the appended drawings.

Figure 1:
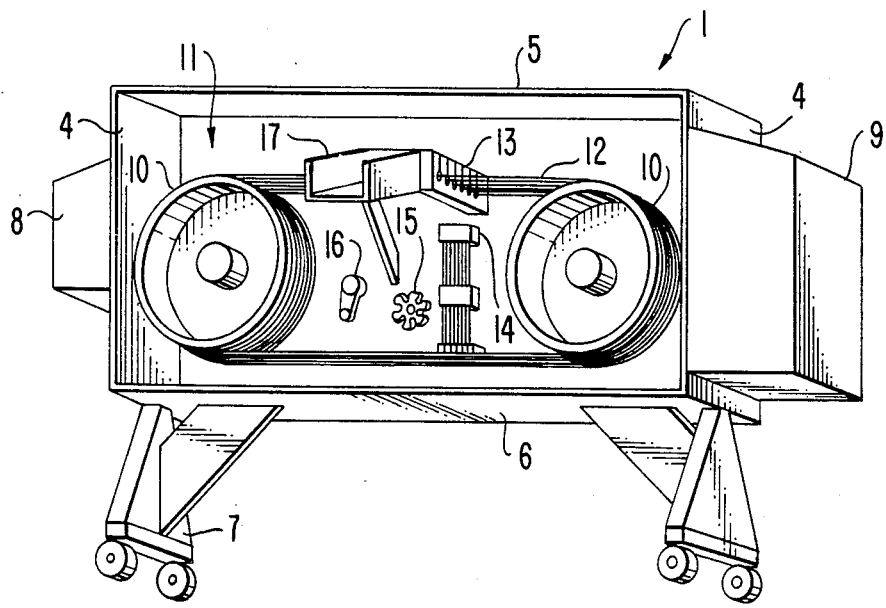
FIG. 1 is a front perspective view of the band-saw with the front cover removed.
Figure 2:
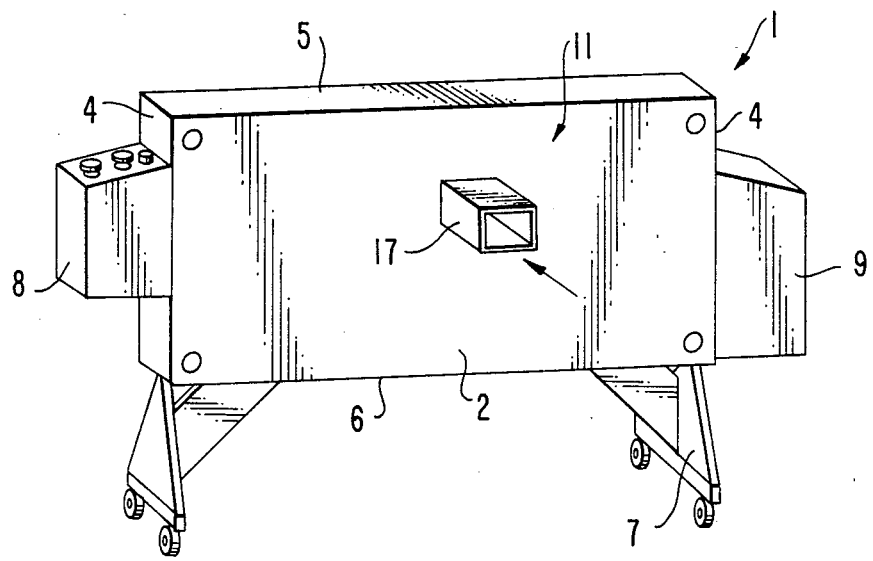
FIG. 2 is a perspective view corresponding to FIG. 1 wherein the feeding direction of the fish block is shown.

In FIGS. 1 and 2, the band-saw according to the invention is schematically shown. The band-saw comprises a frame 11 which is supported by two supports 7. The band-saw has a front side 2, a back side 3, a cover 5, a bottom 6 and two sides 4. An operating panel 8 is arranged on one side 4 and a device 9 for feeding out saw spill is mounted on the other side 4. Inside the frame there are several, and at least two saw blades 12, which extend around two pulleys or drums 10 and through two parallel blade guiding units 13, which are described in more detail below. The saw blades 12 are placed adjacent each other. A cutting and feeding plane 17 is arranged in connection with the blade guiding units and passes through the front side 2 (see FIG. 2). A knob 15 is arranged to incline the frame. In order to strech and tension the saw blades there is connected a handlever 16 and a pneumatic saw blade tension unit 14.

Figure 3:
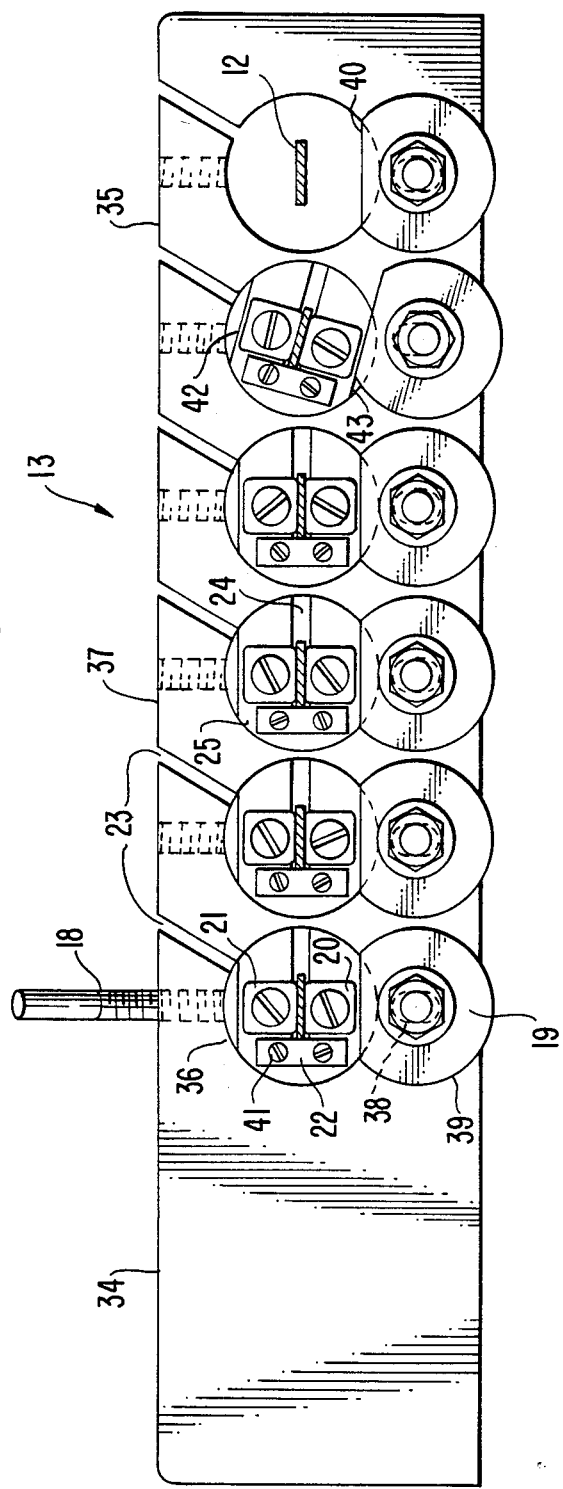
FIG. 3 is an elevational view and shows the guiding unit for the saw blades in detail.
Figure 5:
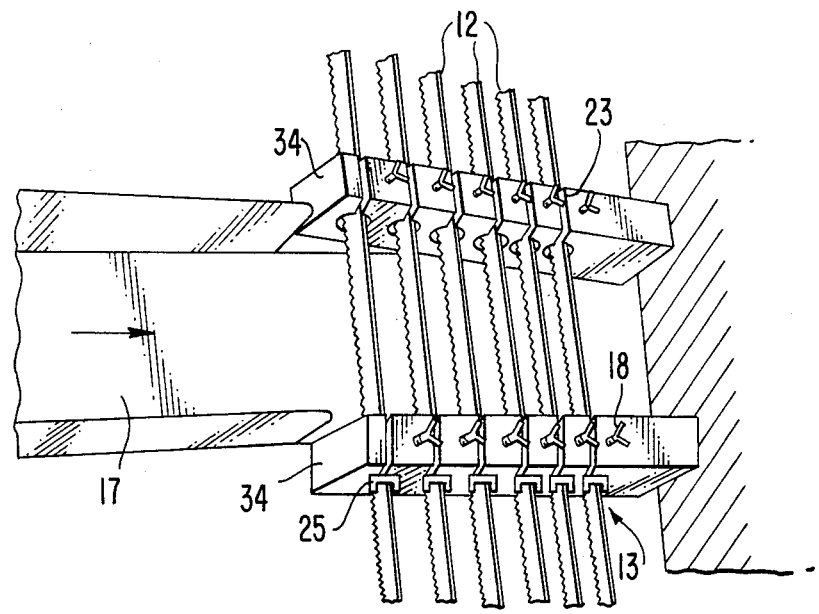
FIG. 5 is a perspective view over the saw blade guiding unit.

The saw blade guiding unit 13 comprises two or more twisting units 34 (such as detail is shown in FIG. 3, compare also FIG. 5) which are placed on each side of the cutting plane 17. In the twisting units there are inclined grooves 23, one of each saw blade, each of which receives one of the saw blades and is enlarged into a hole at its end. In each such hole there is placed a blade guide 25 and below there is a lock plate 19, which together with the lock screw 18 lock the blade in a predetermined position. The blade guide 25 comprises metal bits or inserts 20–22, which support the blades exactly in position and preferably are made of hard metal in order to resist wear. The blade guides are also provided with a blade groove 24. When the saw blade is to be put in place, it is first introduced through the inclined portion of the groove 23. The blade guide 25 is placed for receiving the saw blade, and the groove 24 is positioned in line with the inclined portion of the groove 23, whereby the saw blade can pass down in the groove 24. Thereafter the saw blade is pivoted or twisted to the desired position by means of the blade guide, whereupon it is locked by means of the lock plate 19 and the lock screw 18.

In more detail, the twisting unit consists of a metal block 35 made in one piece and comprising a plurality of bores 36, one for each saw blade. The groove 23 connects the bore with the upper surface 37 of the block. Below each bore, there is an enlongated hole 38 as is shown in broken lines in FIG. 3. A screw extends through each bore and secures a washer 39 in place which constitutes the lock plate 19. The washer 39 has a segment thereof cut off in order to expose a planar surface 40.

The blade guide 25 is made of a cylinder having the same length as the thickness of the block 35. The inserts 20-22 are attached to the cylinder by bolts 41 in order to define said saw blade receiving groove 24. Thus, the saw blade 12 is received between the inserts 20 and 21, which define the plane of the saw blade. The backside of the saw blade abuts the insert 22 and the cutting teeth thereof are positioned in the enlarged area to the right in FIG. 3.

At least the end portion of the cylinder 25 has recessed portions 42 and 43, which present plane surfaces for cooperation with the washer 19. Thus, each cylinder can be withdrawn and inserted from the backside of the metal block 35. However, the position of each individual cylinder will be completely defined by the washer 19. When the cylinder is twisted or pivoted as shown in the righthand portion of FIG. 3, the washer is displaced somewhat downwards, which however is possible due to the elongated hole 38. Thus, it is clear that each cylinder can be taken out in order to check or replace the inserts, without the need for any subsequent realignment of the apparatus.

Preferably, the alignment takes place by a tool, which is placed against the upper surface 37 and includes guiding surfaces for positioning the washers in their correct positions. When all the washers 39 have been tightened and fixed in place, the cylinders can be introduced in their corresponding bores. Of course, it is possible to introduce the saw blades in their bores without the cylinders being inserted, as shown in the righthand portion of FIG. 3.

Figure 4:
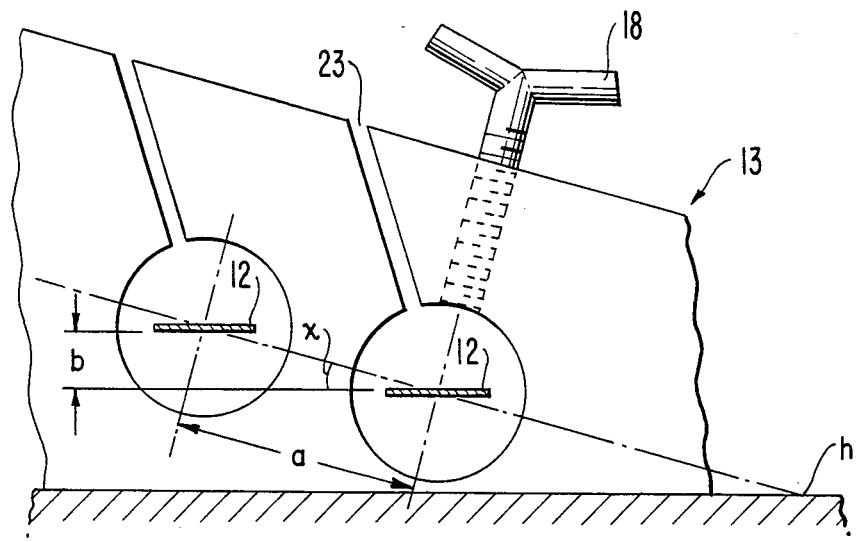
FIG. 4 is a schematic view showing the adjustment of the guide inserts.
Figure 6:
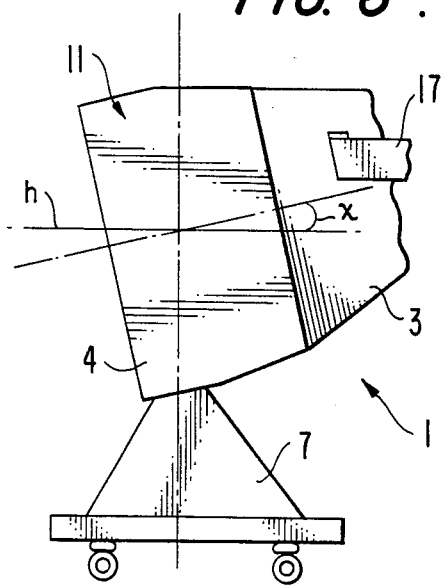
FIG. 6 is a side view of the frame of the band saw.
Figure 8:
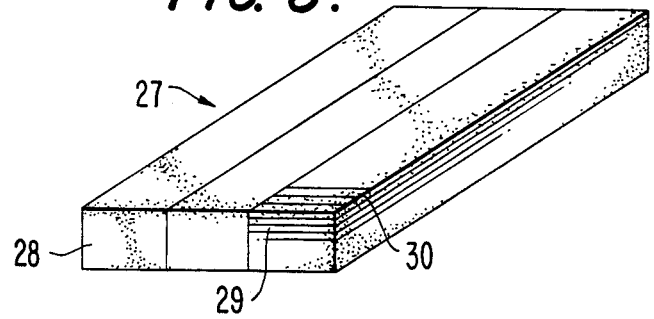
FIG. 8 is a perspective view of a fish-block cut and sliced according to the invention.

As mentioned above, the deep frozen fish has the shape of a big block 27 (FIG. 8), which first is cut into three loaves 28. The loaves are sliced into longitudinal slices 29, e.g. six slices, and are finally cut into portion bits 30. When the loaves are to be sliced by means of the device according to the invention, the frame 11 is inclined a certain angle x, preferably between 0° and 25° in relation to the horizontal plane h (see FIG. 6). The saw blades 12, which are received in the grooves 24 of the guides are twisted by means of the guides 25 to be parallel with the horizontal plane (see FIG. 4). The loaf of frozen fish is fed over the cutting plane 17, which is horizontal, and towards the blade guiding unit 13 where the saw blades are horizontal and are placed with a certain distance between each saw blade, whereupon the loaf is sliced into the intended number of slices in one and the same operation as appears from FIG. 5.

For the tension of the saw blades, there is arranged a hand lever 16, by means of which the distance between the drums can be adjusted for simultaneous tension of all saw blades. Moreover there are arranged individual saw blade tension units 14 by means of which each saw blade can be separately tensioned.

Figure 7:
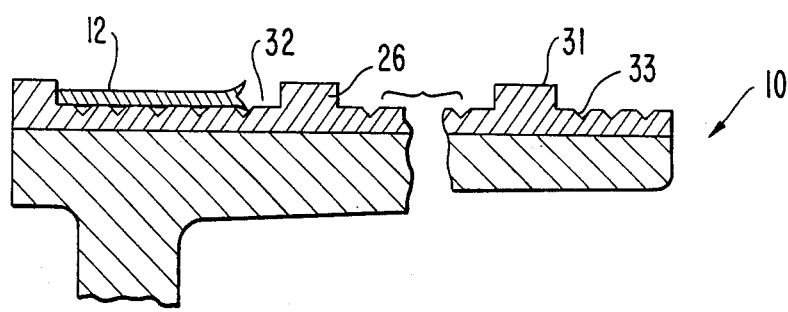
FIG. 7 is a cross-sectional view through the surface of the pulley.

The operation of sawing big deep-frozen blocks places rather high stresses on the saw blades, which thus must be very carefully tensioned in order to achieve a fine cutting surface on the product. In order to prevent the saw teeth of the greatly tensioned saw blades from cutting the drums, the drums are provided with a special surface layer 26. The surface layer 26 is shown in detail in FIG. 7 and comprises shoulders 31, which the saw blades abut, and grooves 32 there-between which receive the saw blades. In order to prevent water gliding or the like, the grooves 32 are provided with narrow, preferably V-shaped channels 33.

The angle at which the frame must be inclined in order to give a certain thickness of the loaf is calculated by means of the formula:

$$\sin x = b/a$$

where
x = the inclination of the frame in relation to the cutting plane or horizontal plane h,
a = the distance between two adjacent blades,
b = the cutting thickness + the thickness of the blade.

The angle is preferably adjusted by means of an angle tool such that exactly the same adjustment is achieved by each saw blade.

By means of the band saw according to the present invention a great number of different slice thicknesses can be achieved by adusting the inclination angle of the frame or by excluding some of the saw blades. According to the preferred embodiment, the band saw comprises six saw blades, which makes it possible to produce up to seven slices in a single operation. Since often one of the surfaces of the loave 28 is uneven, it is suitable to use the sixth or the last saw blade for levelling this unevenness.

The advantages of the band saw according to the present invention in relation to previous technics are several.

Compared to previous methods, wherein each slice is cut in a single operation, fewer operating persons are now required and the speed is higher, which entails economic advantages.

Compared to previous band saws, where several band saws are placed in line, the band saw according to the present invention has a considerable lower investment cost. Moreover, the space required is considerably less and the cleaning time is shorter. Since the band saw according to the present invention only has a single motor, the maintenance is much simpler. Saw spill at only one position makes the collection thereof simpler and, furthermore, the energy consumption is considerably lower.

Above all, the band saw according to the present invention has very great flexibility. The conversion to a new slice format is quickly and easily made.

The band saw is preferably manufactured in stainless steel, but any suitable material can be used. The preferred embodiment described above can be modified in many respects by a skilled person within the scope of the invention. The invention is only limited by the appended patent claims.

I claim:
1. A band saw for slicing a block of e.g. deep-frozen fish into several thin slices, comprising:
two drums over which at least two endless band saw blades are adapted to run;
an inclining means positioned between the drums for inclining the saw blades, said inclining means having a blade guiding unit including a block provided with bores, one for each saw blade, each said bore having a longitudinal axis parallel with the move- ment direction of the saw blades and receiving a respective one of said saw blades;

a cylinder positioned in each said bore, each said cylinder having inserts of a hard metal for positively guiding said saw blades, each of said cylinders being pivotable and securable in a predetermined position for inclining each saw blade to a predetermined angle relative to the axes of the drums; and a washer secured to the block in association with each cylinder and in a predetermined angular position, each said washer having a planar surface, and each cylinder having a planar surface in cooperation with the planar surface on the associated washer in order to define the angular position of the cylinder.

2. A band saw according to claim 1, wherein each cylinder is removable without removing the corresponding saw blade.

3. A band saw according to claim 1, wherein all said washers are simultaneously positioned in a predetermined angular position by an alignment tool.

4. A band saw according to claim 1, wherein said inclining means comprises two blade guiding units positioned symmetrically on each side of the middle point between said drums.

5. A band saw according to claim 1, wherein said drums are supported by a frame which is adjustably tiltable by said predetermined angle, whereby the saw blades are very closely horizontal adjacent the blade guiding unit.

6. A band saw according to claim 1, characterized in that said predetermined angle is between 0° and 25°.

* * * * *